(12) United States Patent
Besson

(10) Patent No.: US 6,360,106 B1
(45) Date of Patent: Mar. 19, 2002

(54) BASE STATION FOR A RADIO COMMUNICATIONS SYSTEM

(75) Inventor: Marcus Besson, Unterhaching (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/319,412

(22) PCT Filed: Nov. 20, 1997

(86) PCT No.: PCT/DE97/02729

§ 371 Date: Jun. 4, 1999

§ 102(e) Date: Jun. 4, 1999

(87) PCT Pub. No.: WO98/26614

PCT Pub. Date: Jun. 18, 1998

(30) Foreign Application Priority Data

Dec. 9, 1996 (DE) .......................................... 196 51 080

(51) Int. Cl.$^7$ .................................................. H04Q 7/00
(52) U.S. Cl. ............................ 455/561; 455/8; 455/453
(58) Field of Search ......................... 455/446, 560–561, 455/8, 574, 443, 444, 453, 562

(56) References Cited

U.S. PATENT DOCUMENTS

| | | | | |
|---|---|---|---|---|
| 5,175,867 A | * | 12/1992 | Wejke et al. ................ | 455/436 |
| 5,289,179 A | * | 2/1994 | Besson, Jr. et al. ......... | 340/826 |
| 5,448,766 A | * | 9/1995 | Sanning et al. ................ | 455/8 |
| 5,487,185 A | * | 1/1996 | Halonen ...................... | 455/127 |
| 5,752,161 A | * | 5/1998 | Jantii et al. ..................... | 455/8 |
| 5,862,483 A | * | 1/1999 | Fletcher et al. ............. | 455/435 |
| 5,890,067 A | * | 3/1999 | Chang et al. ................ | 455/446 |
| 5,991,629 A | * | 10/1999 | Agrawal et al. ............. | 455/446 |
| 6,067,482 A | * | 3/2000 | Shapiro ....................... | 700/286 |

* cited by examiner

Primary Examiner—Vivian Chang
Assistant Examiner—Duc Nguyen
(74) Attorney, Agent, or Firm—Schiff Hardin & Waite

(57) ABSTRACT

A base station for a radio communication system is provided, particularly for a mobile radio network. The base station contains at least two transceivers and at least one antenna for the radio-technical supply of communication connections to at least one remote station. A controller of the base station performs monitoring and organization of the transceivers means such that one of these transceivers means is switched into energy saving mode as soon as it does not supply any communication connections.

9 Claims, 2 Drawing Sheets

BASE STATION FOR A RADIO COMMUNICATIONS SYSTEM

The invention present relates to a base station for a radio communication system, a base station system and a mobile radio system with at least two transceiver means.

DESCRIPTION OF THE PRIOR ART

Radio communication systems are formed by mobile radio systems, wireless telephony systems, or radio stations for wireless extension (RITL radio in the local loop), for example. Mobile radio systems enable the setup of communication connections to mobile subscribers, while radio stations for wireless extension set up communication connections to stationary subscribers. A radio station at the network side is referred to as a base station.

Communication connections are set up and maintained in that signalling information and useful information is communicated via a radio interface. If a number of subscribers on the same carrier frequency of this radio interface are separated by different time slots, this is a time division multiple access system. The time division multiple access method is also referred to as TDMA (Time Division Multiple Access).

One known mobile radio system is the GSM (Global System for Global Communication) mobile radio network, for example. In addition to time division multiple access, other methods for separating the subscribers can additionally be used at the air interface. In the GSM mobile radio system, a frequency division multiplex system is also available. Alternatively or additionally to these methods for subscriber separation, specific codes can also be used for each communication connection.

A base station is a remote unit which is connected to other network components in a wirebound fashion at the network side and which is connected to the terminal equipment, or to another radio station via a radio interface. The power consumption of this type of base station is 2 kW, for example. This value is largely independent of the actual traffic volume in a radio area covered by the base station.

International Patent Application No. WO-A-94/2239 teaches a base station for a radio communication system which comprises a number of transceiver means and which serves for the radio-technical supply of communication connections from/to mobile stations in a serviced radio region. The transceiver means are supported by a main power supply. For various emergencies, caused by overheating, fire and power outage in the base station, for example, (the last case being prevented by the use of a substitute power supply (backup source)), a reduction of the power consumption for the base station is desirable. For this purpose, a control means in the base station either deactivates a variable number of transceiver means during an interruption of the power supply, or it holds them in a standby state, in which they consume less power. The deactivation preferably occurs gradually in several chronologically consecutive stages in which, first, a comparison of the number of transceiver means to a predefined value is performed, and second the transceiver means are deactivated depending on the result of the comparison.

International Patent Application No. WO-A-94128644 discloses a typical radio communication system with base stations, at least one base station controller, and an operations and maintenance center at the network side. The base station contains transceivers which are connected to an antenna unit, as well as a base-station-related local operations and maintenance unit. In the base station, a control unit handles the selective switching of a transceiver means to a communication connection. The transceivers can be automatically controlled either by the base station controller, the network-side operations and maintenance center, or by the base-station-related operations and maintenance unit, so that they are in an operative state or in a stop state, respectively. The transceivers that are not needed are deactivated in order to reduce power consumption.

SUMMARY OF THE INVENTION

It is the object of an invention to provide a base station which can be operated more economically, in cooperation with other network components of a radio communication system, as warranted. This object is inventively achieved in accordance with the invention.

A base station for a radio communication system contains at least one transceiver and at least one antenna for the radio-technical supplying of communication connections to at least one remote station. Furthermore, the base station contains a controller for monitoring and organizing the transceiver and for switching a transceiver into an energy saving mode as soon as the load of a remaining transceiver is less than or equal to a threshold value. It is inventively taken into account that the load of a base station can change very rapidly and it should therefore be possible to supply at least one additional communication connection on a remaining transceiver which is deactivated, without requiring the transceivers which are switched into the energy saving mode.

By this measure, it is possible for the base station to return a transceiver to full functionality from the energy saving mode over a definite time-span. The complete radio-technical supplying of communication connections to remote stations is thus still guaranteed.

The base station can thus respond to the sharp load fluctuations of a radio communication system, e.g. of a mobile radio network, and can adapt its functionality in times of lower traffic volume. Furthermore, a lower energy consumption for the base station is possible on the basis of switching into an energy saving mode. Further advantages emerge from a reduced cooling outlay.

The costs of the energy supply compared to the installation costs of a base station are growing ever more important for operators of a mobile radio network. The inventive base station allows the operator of such a mobile radio network to save operating costs and to offer his or her services more economically. Likewise, the switching of transceivers into the energy saving mode leads to a reduction of interferences in the radio communication system, thereby improving speech quality under certain circumstances.

According to a further development of the invention, the reliability of the radio-technical coverage is further increased in that a transceiver is switched into the energy saving mode only given the presence of a substitute transceiver for an executive channel. By monitoring and allocating communication connections to transceivers, the controller provides that a first transceiver is always operative for an executive channel and that a second transceiver is always operative as a replacement for this, while other transceivers are switched into the energy saving mode given a correspondingly low traffic load.

Even given a sudden failure of the transceivers for the executive channel, an executive channel is continuously available to the remote stations by means of a changeover to the substitute transceiver which. Additional transceiver means are advantageously not completely deactivated, but rather, in the energy saving mode, they consume a mere minimum of energy that is needed for preheating and maintaining control units for starting the transceiver in a few seconds.

Another advantageous development of the invention provides a base station with a cell sectoring wherein at least one transceiver is allocated to each sector by the controller. Preferably, that transceiver which has the largest area of coverage is switched into the energy saving mode. This is particularly advantageous if a transceivers can be connected for a number of sectors of a cell or for all sectors. In contrast to transceivers which are sector-bound, a transceivers which is additionally allocated to the sector or sectors in particular traffic peaks is preferably deactivated given an abatement of the traffic load. On the basis of this development, it is possible to suppress overload peaks for base stations without having to provide transceivers with continuous maximum energy consumption.

The energy saving mode can be designed such that all the functions of the base station are deactivated until controlling occurs for purposes of a renewed startup of the base station. This is of particular importance if the base station is implemented for what is known as a microcell, i.e. of a small cell which is located inside a larger cell (hierarchical cell structures). Such microcells are needed for expanding capacity, though this capacity expansion is necessary only at peak load times.

Outside of these peak load times, this base station with only one transceiver, for example, can be completely deactivated. This potentially eliminates the costs for a dedicated line (dialable ISDN) between the base station and a base station controller, which can be cleared in this case. With the base station for the larger cell (umbrella cell), this type of base station for a microcell forms a base station with at least two transceivers. The controller is formed by the base station controller, for example.

Within a base station, it can also be provided that only the functions of the transmittier are deactivated. Transmitters have a high energy consumption, so that their deactivation is particularly advantageous. In addition to transmitters, means for ventilation, for signal processing, for power supply and for control can be deactivated, as well as means for reception.

An inventive base station system with at least one such base station also contains a base station controller, which is connected to a number of base stations, for organizing the radio-technical coverage and for distributing the communication connections to the transceiver such that a transceiver is switched into an energy saving mode as soon as the load of a remaining transceiver is less than or equal to a threshold value. A base station controller can monitor and valuate the radio relations in a number of cells, so that an organization of the radio-technical coverage is possible, via one base station, and an optimally large number of transceivers can be switched into the energy saving mode.

In order to continuously offer at least the executive channel for each base station, according to another development of the inventive base station system, an optimally large number of communication connections are allocated to a transceiver, which also realizes the executive channel. As this transceiver is prioritized in the allocation of communication connections, other transceivers become free, the deactivation of which is provided without any restrictions.

According to another development of the invention, the radio communication system is implemented as a mobile radio system and contains at least one mobile switching center which is connected to at least one base station system. In addition, the mobile radio system contains at least one operations and maintenance center for evaluating information about the load of transceivers of various base stations and for setting a respective threshold value in reference to the deactivation of additional transceivers.

This makes possible an individual setting for all base stations, which setting satisfies the local conditions for the equipping of base stations and for the individual cells, respectively. In particular, the threshold values can be set such that new communication connections to be set up are allocated first to cells with greater reach, or with higher traffic capacity, and a renewed activation of transceivers for microcells in hierarchical cell structures occurs later.

DESCRIPTION OF THE PRESENTLY PREFERRED EMBODIMENT

Figure 1:
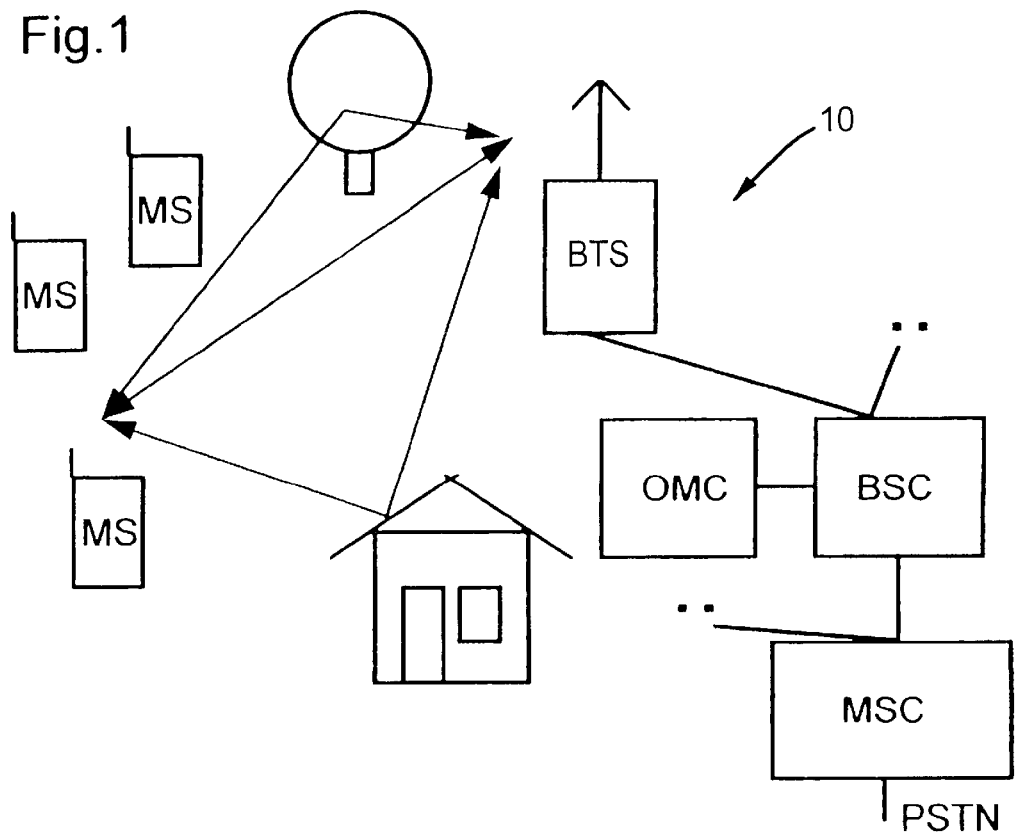
FIG. 1 is a block diagram of a mobile radio network constructed and operated in accordance with the invention.

The mobile radio system 10 illustrated in FIG. 1 is a GSM mobile radio system, which is known in its components and which consists of a number of mobile switching centers MSC which are networked, or, which provide the access to a stationary network PSTN. In addition, these mobile switching centers MSC are connected to at least one base station controller BSC.

In turn, each base station controller BSC enables a connection to at least one base station BTS. This type of base station BTS is a radio station which can establish a communication connection to mobile stations MS via a radio interface. FIG. 1 exemplarily illustrates this type of radio connection to a mobile station MS.

In addition, an organization and maintenance center OMC belongs to the mobile radio system, in which center a management of the configuration, the software, and the performance parameters, as well as a management of the arising errors is carried out. To this end, error messages and messages about operational and performance conditions of the components of the mobile radio system 10 arrive in the operations and maintenance center OMC.

One operations and maintenance center OMC can manage the entire mobile radio system 10 or only subcomponents of the mobile radio system 10. It is further assumed that the operations and maintenance center OMC that is illustrated in FIG. 1 is responsible for a base station system BSS (FIG. 3) which consists of a base station controller BSC and a plurality of base stations BTS.

The radio interface between base station BTS and mobile station MS is organized according to the time division multiplex method. On a carrier frequency, eight time slots are made available, for example, which can be used for different communication connections and for the organization of the radio interface. If a base station BTS also makes a number of carrier frequencies available, there is also a frequency division multiple access.

Figure 2:
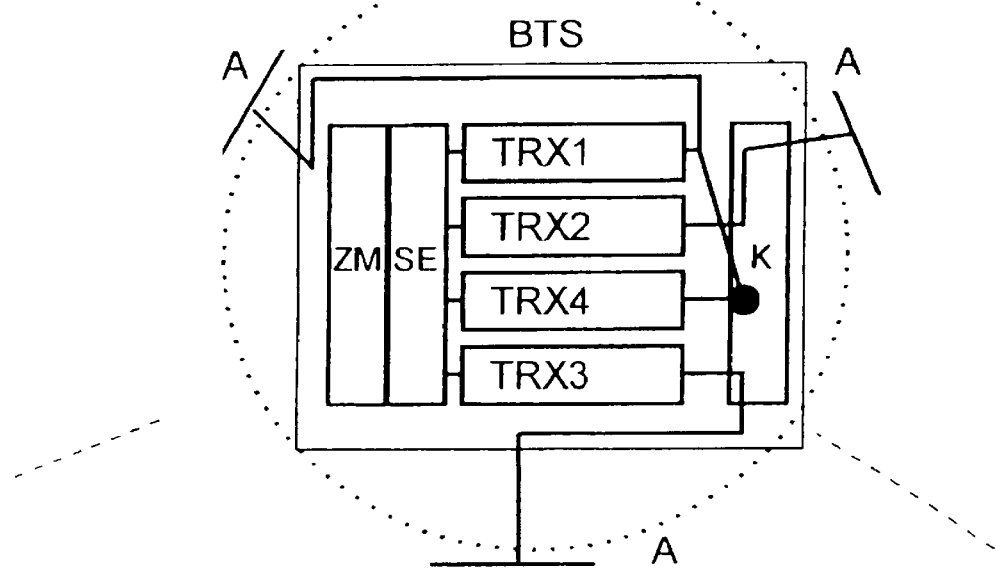
FIG. 2 is a block diagram of a base station constructed and operated in accordance with the invention.

The base station BTS according to FIG. 2 contains four transceivers TRX1 to TRX4, wherein the transceivers TRX1 to TRX3 are each connected permanently to antennas A. An additional transceiver TRX4 can be selectively switched to one of the three antennas A. In addition, the base station BTS contains a controller SE for monitoring and organizing the transceivers TRX1 to TRX4 and a central module ZM. The three, antennas A respectively realize a sector within the cell that is covered by the base station BTS.

Potentially directed by information of the base station controller BSC, the controller SE distributes the communication connections which are supplied by the base station BTS to the transceivers TRX1 to TRX4, by means of a combining unit K, such that the switchable transceivers TRX4 does not supply any communication connections. Given a correspondingly low traffic load (this applies particularly to night hours or to weekends), this is possible, so that the transceiver TRX4 is consequently switched into an energy saving mode. For the energy saving mode, at least the transmit output stage is deactivated or switched to minimal power, although, depending on the load of the remaining transceivers, TRX1 to TRX3, additional means can also be deactivated, such as the receive stage, the signal processing, the control, the ventilation or the power supply.

In switching into the energy saving mode, a threshold value present in the base station controller BSC is interrogated with reference to the load of the remaining transceivers TRX1 to TRX3. This threshold value, which lies at 70%, for example, must not be exceeded by any transceivers TRX1 to TRX3 for the momentary load, so that the unused transceivers TRX4 can be switched into the energy saving mode.

If the base station BTS is not sectored, but all transceivers TRX1 to TRX4 supply an omnidirectionally radiating antenna A, or the base station BTS has at its disposal many transceivers TRX1 to TRX4 then the threshold value only applies for one transceiver TRX1 to TRX4. The threshold should be raised in this case, to for example, 80% (trunking effect).

For the entire cell, or for each sector of the cell, an executive channel is offered whose transceivers TRX1 to TRX3 is not deactivated even if a communication connection is not supplied. This potentially also applies to a substitute transceiver TRX4 for this executive channel (BCCH in GSM mobile radio networks). In this case, it is advantageous to reconfigure, for an omnidirectional coverage, a transceiver TRX to TRX4 that is allocated to a sector.

Figure 3:
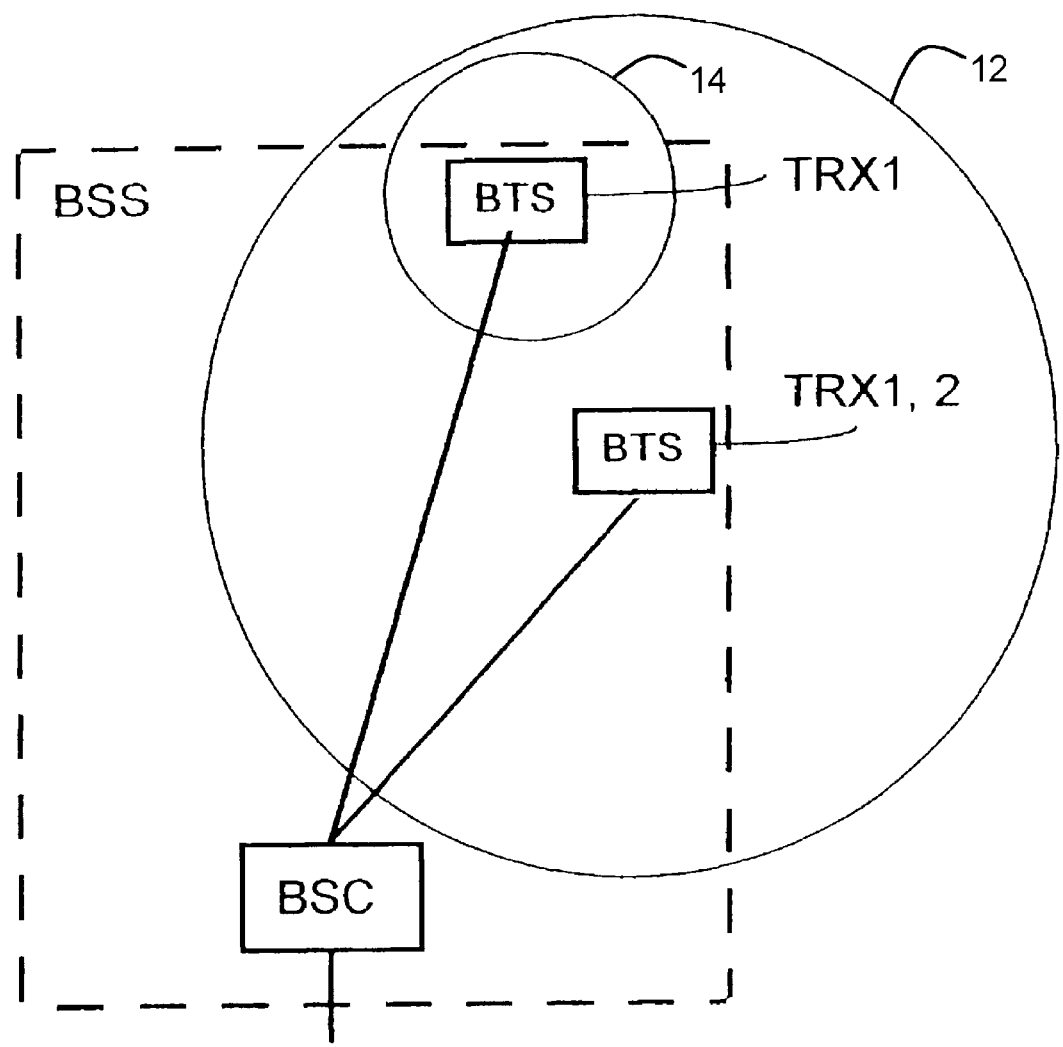
FIG. 3 is a block diagram of a base station system constructed and operated in accordance with the invention.

FIG. 3 depicts a base station system BSS which consists of a base station controller BSC, which is connected to two base stations BTS, for example, and which controls these two base stations BTS. In the base station system BSS, one of the base stations BTS realizes what is known as an umbrella cell 12 having a wide reach, while the second base station BTS realizes a microcell 14 within this umbrella cell 12.

In times of high traffic load, a concentration of communication connections in the microcell 14 is attempted by the base station controller BSC, since this microcell 14 brings about less interference in the mobile radio system 10, with respect to a communication connection. The overall capacity of the network can be thereby increased.

In times of low traffic load, a communication connection is preferably allocated to the base station BTS realizing the umbrella cell 12, so that in the second base station BTS, transceivers TRX1 can be switched into energy saving mode. For this base station BTS, the energy saving mode means that all functions are deactivated. This excludes a means for preheating and functions of the controller SE that remain ready for operation in order to enable a rapid startup of the base station BTS.

The modules at the base station BTS that are affected by the energy saving mode can be set individually according to the configuration of the base station BTS. Details of the design of a base station BTS can be derived from the Siemens product information publication "AirXpress D900/D1800 Mobile Network Base Station Equipment" (February 1996).

The threshold values in reference to the load of transceivers TRX1,TRX2 and the scope of the energy saving mode are set by an operations and maintenance center OMC of the mobile radio system 10. This setting can occur individually for each base station BTS, or each transceivers means TRX1 to TRX3. The operations and maintenance center OMC also evaluates the data of the individual base stations BTS such that a continuous radio-technical coverage is ensured over the entire extent of the mobile radio network 10 and replacement and changeover mechanisms are controlled for the failure of individual transceivers TRX1 to TRX4.

Alternatively, the radio communication system can be implemented as a wireless extension circuit with base stations BTS. The partner in this case is not a mobile station MS, but a second radio station. Not only the radio station of the extension circuit, but also the radio station which is cabled at the network side can be inventively configured. Furthermore, the communication connections between the base stations BTS and the base station controller BSC can be implemented as point-to-multipoint radio relays via which the transceivers can be switched into energy saving mode. A radio-supported interfacing of the base stations BTS between the base stations BTS and the base station controller BSC has the advantage of using replacement and changeover mechanisms according to the invention flexibly and cost-effectively in a wireless fashion as well (e.g. via already existing radio relay routes).

With an inventive base station BTS large fluctuations of the traffic load of a radio communication system can be better and more economically met by corresponding measures for the organization of the communication connections to the transceivers TRX1 to TRX4 and by switching into energy saving mode.

The deactivation of transceivers TRX1, TRX2 enables a more flexible design of the network planning, since a carrier frequency which is allocated for a transceivers TRX1, TRX2 can be used in another cell subsequent to the deactivation. The carrier frequencies can be concentrated in regions with stronger traffic load.

The reorganizing of transceivers TRX1, TRX2 is likewise advantageous given a power outage, since, due to the timely deactivation of transceivers TRX1, TRX2, emergency power supply by a battery is possible over a longer period of time Thus, the total failure of the corresponding cell is delayed. The deactivation of a transceivers TRX1, TRX2 or of an entire base station BTS after a previous redistribution of the communication connections likewise enables maintaining the corresponding means. To this end, a signalling with alarm, release (in reference to transceivers TRX1, TRX2) and deactivation signals takes place between the organization and maintenance center and the corresponding base station BTS.

Although modifications and changes may be suggested by those of ordinary skill in the art, it is the intention of the inventors to embody within the patent warranted hereon all changes and modifications as reasonably and properly come within the scope of their contribution to the art.

We claim:

1. A base station for a radio communication system comprising:
   at least one transceiver;
   at least one antenna that provides a radio-technical supply of communication connections to at least one remote station and;
   a controller that monitors and controls said at least one transceiver and switches one of said transceivers into an energy saving mode as soon as a load of a remaining one of said at least one transceivers is less than or equal to a threshold value.

2. The base station according to claim 1, wherein said controller allocates a transceiver to a number of sectors given a cell sectoring and deactivates said transceiver according to requirements for communication connections in said sectors.

3. The base station according to claim 1 wherein said controller switches at least an output stage of said transceiver into said energy saving mode.

4. A base station system comprising:
   at least one base station having:
      at least one transceiver;
      at least one antenna that provides a radio-technical supply of communication connections to at least one remote station; and
      a controller that monitors and controls said at least one transceiver and switches one of said transceivers into an energy saving mode as soon as a load of a remaining one of said at least one transceivers is less than or equal to a threshold value; and
   a base station controller connected to said at least one base station that organizes radio-technical coverage and distributes communication connections to said transceivers, wherein one of said transceivers is switched into said energy saving mode as soon as a load of one of said at least one transceivers is less than or equal to a threshold value.

5. A mobile radio system comprising:
   at least one mobile switching center connected to at least one base station system, said base station system having:
      at least one base station including:
         at least one transceiver;
         at least one antenna that provides a radio-technical supply of communication connections to at least one remote station; and
         a controller that monitors and controls said at least one transceiver and switches one of said transceivers into an energy saving mode as soon as a load of a remaining one of said at least one transceivers is less than or equal to a threshold value; and
      a base station controller connected to said at least one base station that organizes radio-technical coverage and distributes communication connections to said transceivers, wherein one of said transceivers is switched into said energy saving mode as soon as a load of one of said at least one transceivers is less than or equal to a threshold value; and
   at least one operations and maintenance center that evaluates information about a load of said transceivers of various base stations and for respectively setting said threshold value.

6. The mobile radio system according to claim 5, further comprising:
   a number of cells allocated to base stations, wherein at least a part of said number of cells are implemented as smaller cells within larger cells, wherein said transceivers which cover said smaller cells are switched into said energy saving mode.

7. The mobile radio system according to claim 6, wherein additional transceivers are deactivated in said base station that covers said smaller cell.

8. The mobile radio system according to claim 5, wherein said operations and maintenance center changes said threshold value according to a time schedule.

9. The mobile radio system according to claim 5, further comprising:
   a selectable dedicated line between said at least one base station that is switched into said energy saving mode and said base station controller connected to said at least one base station.

* * * * *